(12) United States Patent
Duppe et al.

(10) Patent No.: US 8,330,455 B2
(45) Date of Patent: Dec. 11, 2012

(54) SENSOR ARRANGEMENT FOR A SHAFT THAT IS MOUNTED IN A MAGNETIC BEARING

(75) Inventors: Carsten Duppe, Kuernach (DE); Harald Grab, Hannover (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 277 days.

(21) Appl. No.: 12/676,276

(22) PCT Filed: Sep. 3, 2008

(86) PCT No.: PCT/DE2008/001484
§ 371 (c)(1),
(2), (4) Date: Mar. 30, 2010

(87) PCT Pub. No.: WO2009/030221
PCT Pub. Date: Mar. 12, 2009

(65) Prior Publication Data
US 2010/0201353 A1 Aug. 12, 2010

(30) Foreign Application Priority Data
Sep. 8, 2007 (DE) .......................... 10 2007 042 920

(51) Int. Cl.
*G01B 7/30* (2006.01)

(52) U.S. Cl. .................................................. 324/207.25
(58) Field of Classification Search ............. 324/207.25; 73/514.31, 514.39
See application file for complete search history.

(56) References Cited

U.S. PATENT DOCUMENTS

| 4,473,259 A | 9/1984 | Goldowsky |
| 6,532,246 B1 | 3/2003 | Fukuyama |
| 7,307,415 B2 * | 12/2007 | Seger et al. ................. 324/207.2 |
| 7,692,422 B2 * | 4/2010 | Yamamoto et al. ........... 324/174 |
| 2003/0041440 A1 * | 3/2003 | Shonai et al. .............. 29/603.09 |

* cited by examiner

*Primary Examiner* — Bot Ledynh
(74) *Attorney, Agent, or Firm* — Lucas & Mercanti, LLP; Klaus P. Stoffel

(57) ABSTRACT

A sensor arrangement for a shaft that is mounted in a magnetic bearing. The arrangement has magnetic shielding which shields the magnetic bearing by forming a magnetically shielded area, magnetic encoding that is situated on the shaft in the magnetically shielded area and at least one receiver that detects at least one alteration of the magnetic field of the magnetic encoding. The aforementioned sensor arrangement for a shaft that is mounted in a magnetic bearing permits the an arrangement of this type that uses magnetic encoding of the shaft to detect the position of the shaft in the closest proximity possible to the magnetic bearing.

19 Claims, 2 Drawing Sheets

SENSOR ARRANGEMENT FOR A SHAFT THAT IS MOUNTED IN A MAGNETIC BEARING

This application is a 371 of PCT/DE2008/001484 filed Sep. 3, 2008, which in turn claims the priority of DE 10 2007 042 920.9 filed Sep. 8, 2007, the priority of both applications is hereby claimed and both applications are incorporated by reference herein.

FIELD OF THE INVENTION

The invention relates to a sensor arrangement for a shaft that is mounted in a magnetic bearing.

BACKGROUND OF THE INVENTION

In practical use of a shaft that is mounted in a magnetic bearing, it is known that difficulties occur when the position of the shaft is to be determined in the axial or radial direction in the bearing, particularly when the shaft has an associated magnetic marking whose movement is detected in order to deduce the position or further operating characteristics of the shaft, such as the rotation speed or torque, from the movement of the magnetic marking on the shaft. In this case, particularly in the vicinity of the magnetic bearing, the magnetic field of the magnetic marking is superimposed on the magnetic field of the magnetic bearing, as a result of which it is now virtually impossible to clearly separate the resultant magnetic field, with regard to the contribution made by the magnetic marking.

WO 2006/013092 A1 describes a sensor arrangement for a mounted shaft, wherein the sensor arrangement comprises a signal transmitter a magnetic coding, which is in the form of a magnetized area formed on the body of the shaft, and a receiver which is in the form of a coil, wherein the coil comprises a change in the magnetic field of the magnetic coding. Mechanical stresses in the body of the shaft result in a change in the magnetic field of the magnetic coding because of the magnetostrictive effect, which change is detected by the receiver, and in which case a position of the shaft in the bearing can be deduced indirectly. An arrangement such as this cannot be readily used for a shaft that is mounted in a magnetic bearing, since the magnetic field of the magnetic bearing is superimposed by the change in the magnetization of the magnetic coding. One particular problem is that the magnetic field of the magnetic bearing varies over time, in such a way that the magnetic bearing superimposes a time-dependent signal on the magnetic field measured by the coil. A further disadvantage is that the described measurement arrangement is suitable only for those shafts whose body is composed of a material which is magnetizable, but it is these shafts in particular which are influenced by the magnetic field of the magnetic bearing.

DE 10 2004 025 387 A1 describes a sensor arrangement for a mounted shaft, whose body is composed of an electrically conductive material which is magnetizable. The sensor arrangement comprises a magnet which is arranged at the side on the body, approximately at its center. When an electric current is passed through the body of the shaft, a magnetic field is induced in the body, which is superimposed by the magnetic field of the magnet at the location of the magnet, as a result of which mechanical stresses occur in the body of the shaft at the location of the magnet in the body of the shaft because of the magnetostrictive effect, which mechanical stresses propagate along the body of the shaft and can be detected at one end of the shaft. The distance between the point at which the current pulse was introduced in the shaft and the point at which the magnet is located can be deduced indirectly from the time between the initial current pulse and the occurrence of the mechanical stresses, such that the position of the shaft relative to the magnet is indirectly detectable. The design is complex overall and is virtually impossible to use for a shaft that is mounted in a magnetic bearing, since the magnetic fields of the magnetic bearing continuously cause changing mechanical stresses in the body of the shaft, which are superimposed on the actual measurement variable. In addition, only axial positioning of the shaft can be detected, but not a radial position of the shaft in the bearing.

OBJECT OF THE INVENTION

The object of the invention is to specify a sensor arrangement for a shaft that is mounted in a magnetic bearing, which sensor arrangement makes it possible to detect the position of the shaft as close to the magnetic bearing as possible, on the basis of a magnetic coding on the shaft.

SUMMARY OF THE INVENTION

According to the invention, this object is achieved by a sensor arrangement which has a magnetic shield that shields the magnetic bearing forming a magnetically shielded area, a magnetic coding that is arranged in the magnetically shielded area on the shaft, and at least on receiver that detects at least a change in a magnetic field of the magnetic coding.

Because of the magnetic shield and the arrangement of the receiver in the magnetically shielded area, the receiver is no longer influenced by the magnetic field of the magnetic bearing. The position of the shaft can then be determined—largely without being influenced by the magnetic bearing—by a suitable configuration of the magnetic coding. Effects of the magnetic bearing which have an influence on the magnetization of the body of the shaft can be identified and separated by means of electronics that are associated with the receiver.

Provision is preferably made for the magnetic coding to be formed by a magnetized section of the body of the shaft, such that the shaft does not require any physical changes.

As an alternative to this, provision is preferably made for the magnetic coding to be formed by a coding element which is applied to the body of the shaft. On the basis of the coding element, the magnetic coding can also be provided for those shafts which are composed of a material which cannot be magnetized. Furthermore, the embodiment of the coding element presents the possibility to provide the magnetic coding both in the axial and in the radial direction, in such a way that the receiver can simultaneously determine the position of the shaft in the axial direction and in the radial direction.

With regard to the embodiment of the magnetic coding, it is preferable for the magnetic coding to comprise a resonant circuit, and for the receiver to detect the magnetic component of the electromagnetic radiation emitted from the resonant circuit. In this case, the electromagnetic radiation emitted from the resonant circuit allows detection of the magnetic coding by the receiver, without having to make use of the magnetostrictive effect. Furthermore, the frequency of the emitted electromagnetic radiation may provide additional information which can also be detected and evaluated by the receiver. On the basis of the frequency and/or the frequency response of the electromagnetic radiation, the receiver can identify interference influences, for example resulting from the earth's magnetic field or resulting from incompletely shielded components of the magnetic field of the magnetic bearing, and can suppress these for the subsequent evaluation.

With regard to the formation of the magnetic coding by a resonant circuit, it is particularly preferable for the receiver to comprise a coil and for the coil to be inductively coupled to the resonant circuit, wherein the coil excites the resonant circuit to emit the electromagnetic radiation. The receiver therefore provides electrical power for the resonant circuit, to be precise in a contactless manner, without any need for connection by means of cables. When the resonant circuit moves relative to the receiver, the inductive coupling occurs only when the plane of the resonant circuit is essentially parallel to a direction defined by the coil. Different resonant circuits which are arranged in a distributed manner along the circumference of the shaft therefore each only briefly actuate a specific coil in the receiver, thus making it possible to achieve increased radial or axial resolution for position finding, by the provision of a plurality of resonant circuits and/or a plurality of coils.

The magnetic shield is preferably formed by a shielding plate; alternatively or in addition to this, the magnetic shield may also be formed by an electrically conductive coating, wherein it is self-evident that the electrically conductive coating is additionally provided on the shielding plate. The magnetic shield may be physically separate from the receiver; however, the receiver may be arranged in a housing, in which case the housing itself has a magnetically shielding effect. The magnetically shielding housing of the receiver may in this case replace or complement the magnetic shielding provided by the shielding plate and/or provided by the electrically conductive coating, for example in that the housing shields the receiver from those components of the magnetic field of the magnetic bearing which are not completely shielded by the shielding plate and/or by the electrically conductive coating.

The receiver preferably comprises two half-cylinders, which cover the magnetic coding in the radial direction. The two half-cylinders form a housing, which covers and therefore shields the magnetic coding along the circumference of the housing. The half-cylinder preferably at least partially covers the magnetic coding in the axial direction, to be precise in particular on both sides. Each of the half-cylinders therefore has an essentially U-shaped cross section. Forming the housing of the receiver as half-cylinders in this case makes it possible for each of the half-cylinders to be applied to the magnetic coding such that the two limbs of the U cover the magnetic coding in the axial direction, wherein the half-cylinders may extend to close to the magnetic coding and may assume a distance of 2 mm or less from the magnetic coding.

The receiver itself preferably comprises at least one coil which detects the magnetic field of the magnetic coding, and in particular can detect a change in the magnetic field of the magnetic coding. In comparison to other magnetic-field sensors such as Hall sensors or Reed sensors, coils have the advantage that they can also act as transmitters for electromagnetic radiation, particularly when the magnetic coding is formed by a resonant circuit which is inductively coupled.

The magnetic coding can be arranged both on a side surface of the shaft and on an end surface of the shaft.

Further advantages and features of the invention will become evident from the description of one exemplary embodiment, and from the dependent claims.

The invention is described and explained in more detail in the following text, using one preferred exemplary embodiment and with reference to the attached drawings.

DETAILED DESCRIPTION OF THE DRAWING

Figure 1:
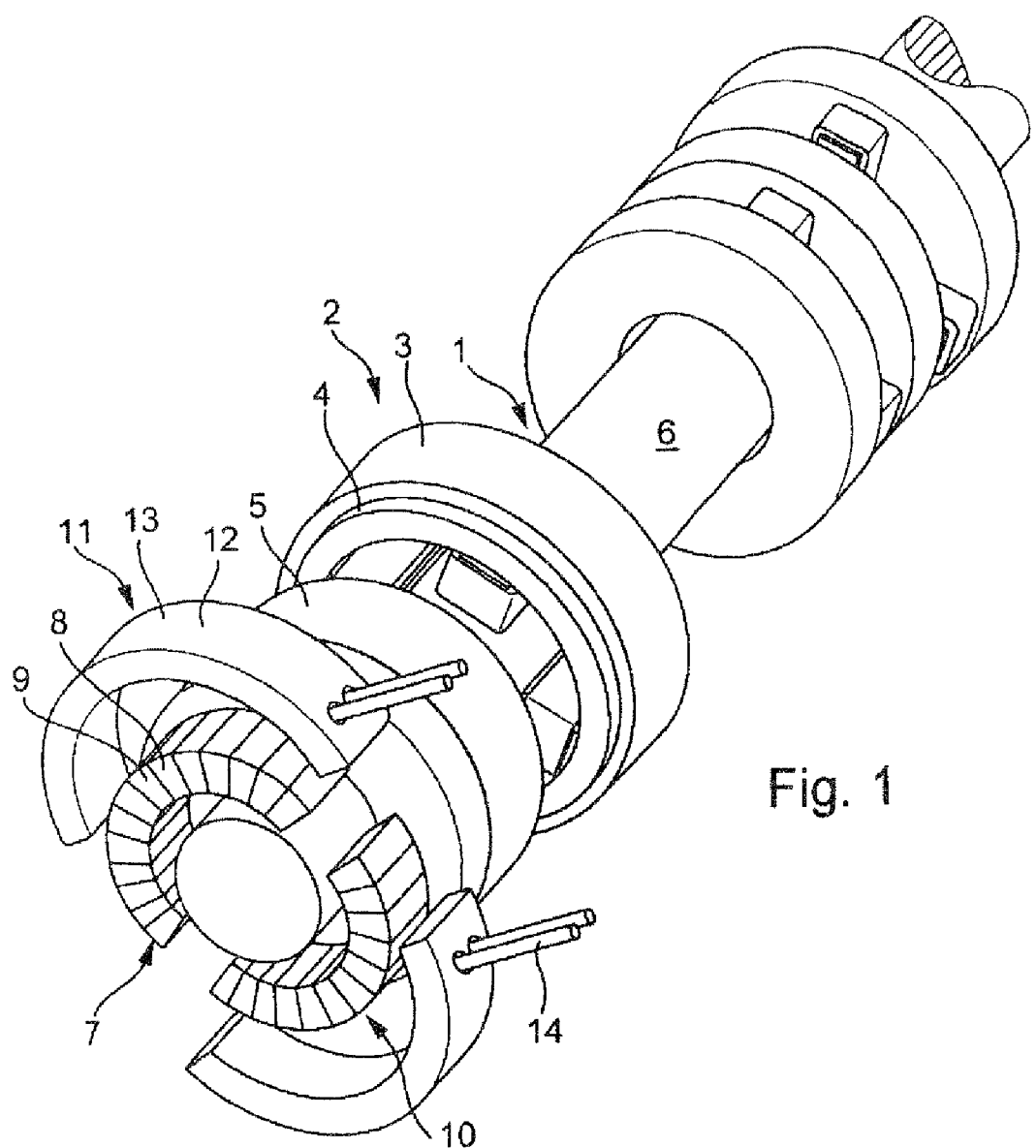
FIG. 1 shows an exploded illustration of one exemplary embodiment of a sensor arrangement according to the invention.

FIG. 1 shows a shaft 1 that is mounted in a magnetic bearing 2. The magnetic bearing 2 comprises a bearing ring 3 which has a groove 4. A section of a shielding plate 5 is insertable into the groove 4.

The body 6 of the shaft 1 is composed of a material which cannot be magnetized, for example of a steel with a small proportion of chromium. An annular coding element 7 is attachable to the body 6 of the shaft 1, wherein the coding element 7 is illustrated in two parts in the illustration shown in FIG. 1. In the fitted position, the coding element 7 is attached to the body 6 of the shaft 1 by means of an interference fit.

The coding element 7 has a peripheral, radial circumferential surface 8, which points away from the body 6 of the shaft 1, and an axial end surface 9 which points away from the bearing ring 3. A magnetic coding 10 is provided on the coding element 7 and is in the form of a sequence of sections of different magnetization, both on the end surface 9 and on the circumferential surface 8.

FIG. 1 also shows a receiver 11 with a housing 12 which is formed from two half-cylinders 13. Each of the half-cylinders 13 has a U-shaped cross section, with the limbs of the U, when in the installed position, overlapping the end surface 9 and the further end surface of the coding element 7, while the base area of the U covers the circumferential surface 8 of the coding element.

A coil is also arranged in the housing 12, which detects the change in the magnetic field of the magnetization of the coding element 7 as soon as the coding element 7 moves relative to the coil. Electrical supply lines 14 can also be seen, which lead into each of the half-cylinders 13, acting on the coil which is arranged within the half-cylinder 13 or, at their ends, and which produce a voltage drop in the coil by means of the voltages which are induced by the magnetic field of the coding element 7.

In the fitted position, the shielding plate 5 is held in sections in the groove 4 of the bearing ring 3, and the shielding plate 5 is therefore attached to the bearing ring 3 of the magnetic bearing 2. The coding element 7 is joined to the body 6 of the shaft 1 by means of an interference fit at an axial distance from the shielding plate 5, and the receiver 11 completely covers the coding element 7 in the circumferential direction, and at least partially covers it in the axial direction.

The magnetic shield is effected partially by the shielding plate 5, partially by the distance between the coding element 7 and the shielding plate 5, and partially by the housing 12 of the receiver, specifically in the housing 12 by the partial overlap of the end surfaces 9 of the coding element or the overlap of the circumferential surface 8 of the coding element by the housing 12. The two housing halves 13 are at a distance of less than 2 mm from the coding element 7, in order to suppress the influence of magnetic interference fields.

Figure 2:
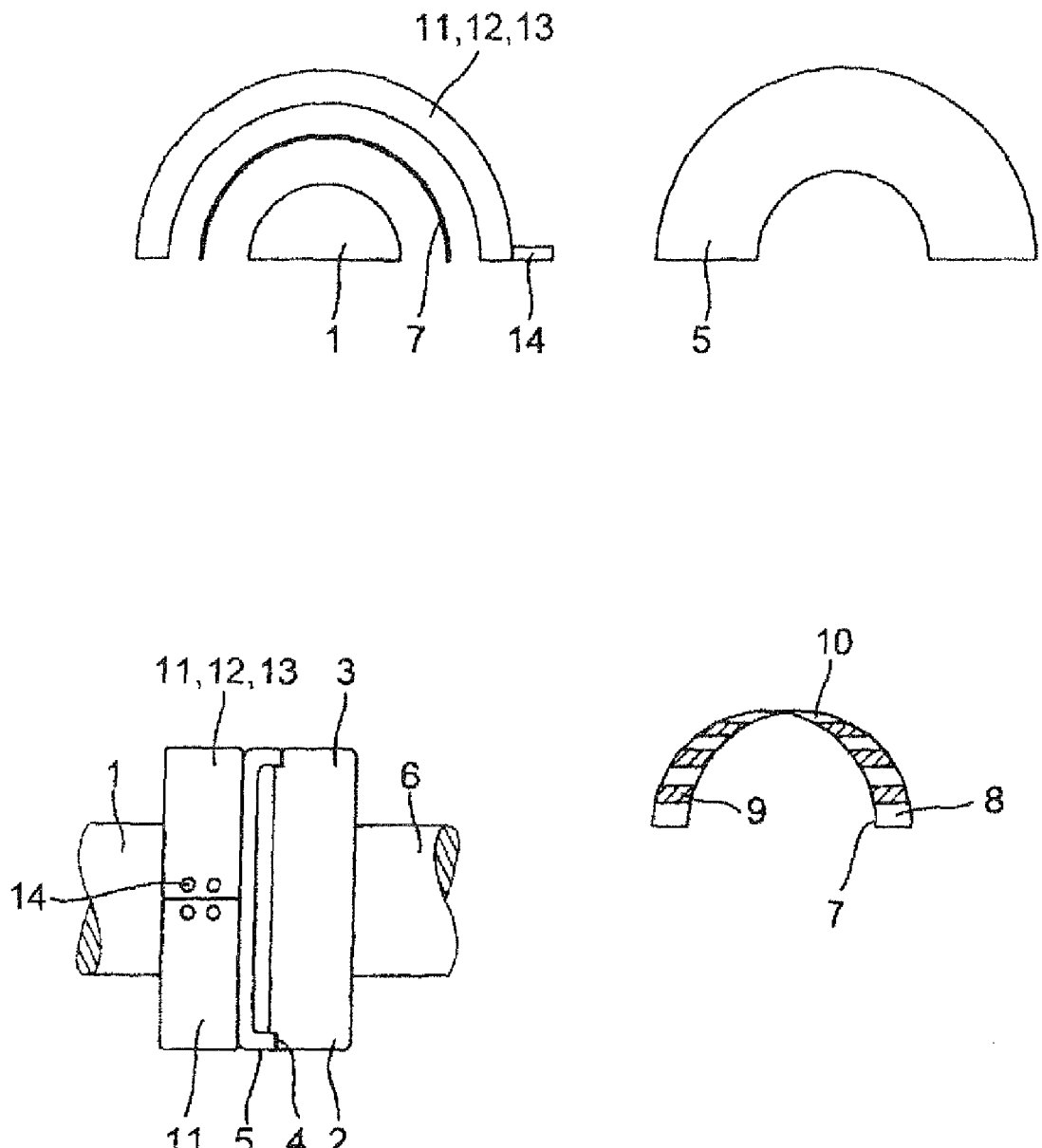
FIG. 2 shows four partial diagrammatic views of the details of the exemplary embodiment shown in FIG. 1.

FIG. 2 shows the details of the exemplary embodiment illustrated in FIG. 1, wherein identical or comparable components are provided with the same reference symbols. The left-hand upper part of the diagram in FIG. 2 schematically illustrates a plan view of the shaft 1 with the coding element 7 of one of the half-cylinders 13 of the housing 12, in which the receiver 11 is arranged. In the right-hand upper part of the diagram, FIG. 2 shows the upper section of the shielding plate 5. In this case, it is self-evident that the shielding plate 5, which is illustrated as being integral in FIG. 1, may also be formed from two parts. The left-hand lower part of the diagram in FIG. 2 shows a side view with the shaft 1, the receivers 11 which are arranged with the half cylinders 13 in the housing 12, and the supply line 14 for supplying the receivers 11, as well as the shielding plate 5 and the magnetic bearing 2 with a bearing ring 3 which holds the body 6 of the shaft 1. The figure shows the groove 4 in the bearing ring 3, in which the shielding plate 5 is held by means of flanging at the edge. The right-hand lower part of the diagram in FIG. 2 shows one half of the coding element 7, in which the magnetic coding 10 is formed on the radial circumferential surface 8 on one axial end surface 9 and is formed from a sequence of circumferential regions with different magnetization, and/or a sequence of regions which are or are not magnetized.

In the exemplary embodiment described above, the coding element 7 was hollow-cylindrical and was attached to the side surface of the body 6 of the shaft 1. It is self-evident that a coding element may also be arranged on the end surface of the shaft 1 and, for example, is circular, with the magnetized sections being in the form of circle segments. It is also self-evident that a combination of a circular coding element and a coding element comprising a hollow-cylindrical part can also be provided, and is fitted over an end section of the shaft 1.

In the exemplary embodiment described above, the sensor arrangement was arranged, together with the shielding plate 5, the coding ring 7 and the receiver 11, outside the magnetic bearing 2, immediately adjacent to the bearing ring 3. It is self-evident that the sensor arrangement may also be arranged in the magnetic bearing 2, for example between the bearing ring 2 and a further bearing ring of the magnetic bearing 2; in this case, magnetic shields must then be provided on both sides, toward the two bearing rings.

List Of Reference Symbols

1 Shaft
2 Magnetic bearing
3 Bearing ring
4 Groove
5 Shielding plate
6 Body of the shaft 1
7 Coding element
8 Radial circumferential surface
9 Axial end surface
10 Magnetic coding
11 Receiver
12 Housing
13 Half-cylinder
14 Supply line

The invention claimed is:

1. A sensor arrangement for a shaft that is mounted in a magnetic bearing having magnetic fields, comprising:
   a magnetic shield which shields the magnetic bearing forming a magnetically shielded area from the magnetic fields of the magnetic bearing by forming a shielded area where the sensor is arranged;
   a magnetic coding which is arranged in the magnetically shielded area on the shaft; and
   at least one receiver, which detects at least a change in a magnetic field of the magnetic coding.

2. The sensor arrangement of claim 1, wherein the magnetic coding is formed by a magnetized section of a body of the shaft.

3. The sensor arrangement of claim 1, wherein the magnetic coding is formed by a coding element which is applied to a body of the shaft.

4. The sensor arrangement of claim 3, wherein the magnetic coding comprises a resonant circuit, and in that the receiver detects a magnetic component of an electromagnetic radiation emitted from the resonant circuit.

5. The sensor arrangement of claim 4, wherein the receiver comprises a coil, and the coil is inductively coupled to the resonant circuit, and wherein the coil excites the resonant circuit to emit the electromagnetic radiation.

6. The sensor arrangement of claim 1, wherein the magnetic shield is formed by a shielding plate.

7. The sensor arrangement of claim 1, wherein the magnetic shield is formed by an electrically conductive coating.

8. The sensor arrangement of claim 1, wherein the receiver comprises at least one coil.

9. The sensor arrangement of claim 1, wherein the magnetic coding is arranged on a side surface of the shaft.

10. The sensor arrangement of claim 1, wherein the magnetic coding is arranged on an end surface of the shaft.

11. A sensor arrangement for a shaft that is mounted in a magnetic bearing, comprising:
    a magnetic shield which shields the magnetic bearing forming a magnetically shielded area;
    a magnetic coding which is arranged in the magnetically shielded area on the shaft; and
    at least one receiver, which detects at least a change in a magnetic field of the magnetic coding,
    wherein the receiver comprises a housing with two half-cylinders, and the two half-cylinders cover the magnetic coding in a radial direction.

12. The sensor arrangement of claim 11, wherein the half-cylinders at least partially cover the magnetic coding in an axial direction.

13. The sensor arrangement of claim 11, wherein the magnetic coding is formed by a magnetized section of a body of the shaft.

14. The sensor arrangement of claim 11, wherein the magnetic shield is formed by a shielding plate.

15. The sensor arrangement of claim 11, wherein the magnetic shield is formed by an electrically conductive coating.

16. The sensor arrangement of claim 1, wherein the receiver comprises at least one coil.

17. The sensor arrangement of claim 1, wherein the magnetic coding is arranged on a side surface or an end surface of the shaft.

18. A bearing assembly, comprising:
    a magnetic bearing having magnetic fields;
    a sensor arrangement for a shaft that is mounted in the magnetic bearing;
    a magnetic shield, which shields the magnetic bearing from the magnetic fields of the magnetic bearing by forming a magnetically shielded area where the sensor is arranged;
    a magnetic coding which is arranged in the magnetically shielded area on the shaft; and
    at least one receiver, which detects at least a change in a magnetic field of the magnetic coding.

19. The sensor arrangement of claim 1, wherein the magnetic bearing has a bearing ring with a groove, a portion of the shielding plate being insertable into the groove.

* * * * *